United States Patent [19]
Bielfeldt et al.

[11] 3,849,048
[45] Nov. 19, 1974

[54] DISTRIBUTOR AND NOZZLE ASSEMBLY FOR INJECTION-MOLDING MACHINES

[75] Inventors: Friedrich Bernd Bielfeldt, Aidenried; Richard Herbst, Munich, both of Germany

[73] Assignee: Krauss-Maffei A.G., Munich, Germany

[22] Filed: May 3, 1972

[21] Appl. No.: 250,078

[30] Foreign Application Priority Data
May 4, 1971 Germany.............................. 2121895

[52] U.S. Cl......................... 425/247, 425/DIG. 229
[51] Int. Cl............................................... B29f 1/03
[58] Field of Search .......... 425/247, 248, 257, 258, 425/DIG. 229

[56] References Cited
UNITED STATES PATENTS

| | | | |
|---|---|---|---|
| 2,304,461 | 12/1942 | Knowles.................... | 425/DIG. 229 |
| 2,773,284 | 12/1956 | Kelly.......................... | 425/DIG. 229 |
| 2,865,050 | 12/1958 | Strauss....................... | 425/DIG. 229 |
| 2,912,719 | 11/1959 | Gilmore..................... | 425/DIG. 229 |
| 2,928,125 | 3/1960 | Smucker..................... | 425/247 X |
| 3,113,346 | 12/1963 | Bright......................... | 425/247 |
| 3,238,568 | 3/1966 | Barnett....................... | 425/DIG. 229 |
| 3,339,239 | 9/1967 | Peck........................... | 425/247 X |
| 3,488,810 | 1/1970 | Gellert........................ | 425/DIG. 229 |

Primary Examiner—J. Spencer Overholser
Assistant Examiner—John S. Brown
Attorney, Agent, or Firm—Karl F. Ross; Herbert Dubno

[57] ABSTRACT

A distributor and nozzle assembly for injection-molding machines in which the distributor or manifold has a central inlet passage communicating with the injector apparatus and a plurality of angularly spaced arms along which extend passages running to respective nozzle assemblies at the ends of these arms. The nozzle assemblies are each formed with a nozzle needle displaceable under hydraulic pressure and are themselves displaceable under hydraulic pressure or at least are pressurized via respective cylinder arrangements or by the pressure of the resin to maintain a seal at the injector-nozzle outlets between surface perpendicular to the nozzle/mold displacement direction.

8 Claims, 10 Drawing Figures

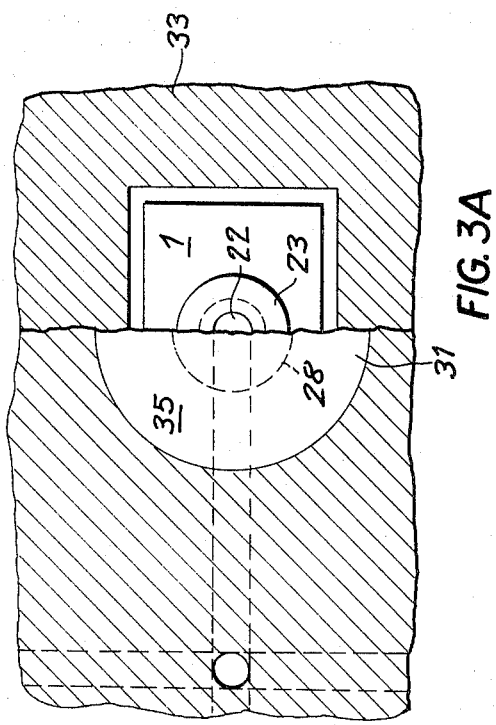
FIG.3A
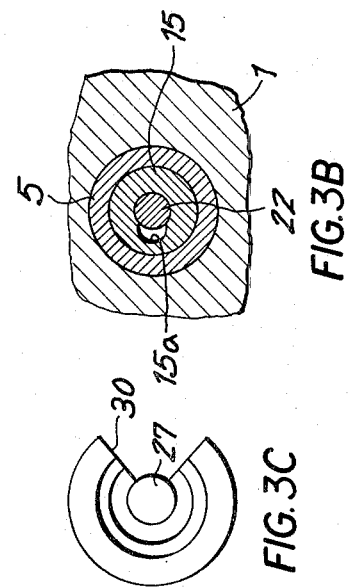
FIG.3B
FIG.3C
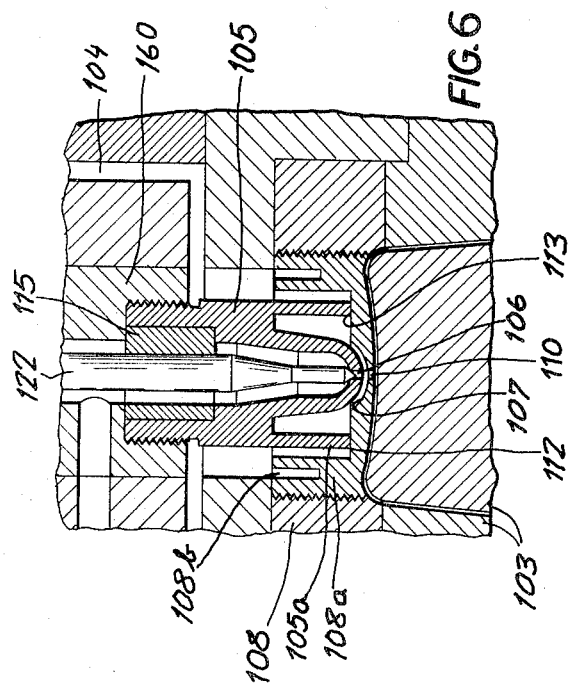
FIG.6
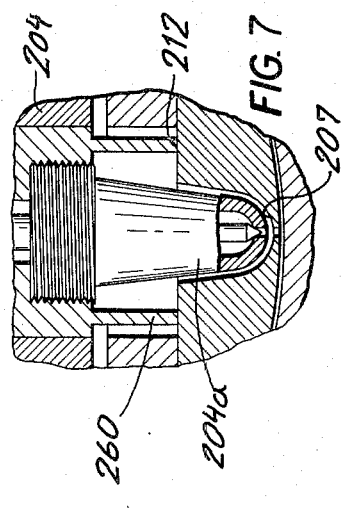
FIG.7

DISTRIBUTOR AND NOZZLE ASSEMBLY FOR INJECTION-MOLDING MACHINES

FIELD OF THE INVENTION

Our present invention relates to a distributor arrangement for delivering injection-molding materials to a plurality of nozzle assemblies and, more particularly, to a nozzle assembly for an injection-molding machine and a distributor or manifold arrangements associated therewith. More generally the the injection relates to injection-molding machines and improvements in distributors for the injection-molding material thereof.

BACKGROUND OF THE INVENTION

An injection-molding machine generally comprises a multipartite mold disposed ahead of a nozzle arrangement which communicates with a source of injection-mold material, e.g. a thermoplastic synthetic resin which has been rendered plastic by melting and/or mastification. The source is generally provided with a plunger or ram adapted to drive the plasticized mass through a nozzle orifice into the mold cavity.

A typical machine of this type comprises a bed along which the mold parts are movable to enable opening and closing of the mold ejection of the molded article from the molded part retaining same, and means for holding the mold in a closed condition under the augmented pressure generated by the ram. In many cases a single mold may have a plurality of cavities or a number of individual molds may be provided. In systems in which the mold also is formed with the distributor of manifold passages for communicating between the nozzle orifice and the mold cavity, problems are encountered because of changes in the properties of the injection-moldable material which must travel along different paths and/or may be subjected to different temperatures or other conditions.

It has been proposed to provide a mold having a plurality of inlet orifices each communicating with a respective mold cavity or wherein two or more communicate with a single mold cavity, the machine having a corresponding number of injection nozzles or discharge orifices for registry with the inlet orifices. While this arrangement reduces the tendency of the synthetic resin traversing each orifice to differ in some significant characteristics from the material traversing other orifices, some substantial problems of sealing are encountered. Sealing problems are often pronounced even where a single nozzle communicates with a single mold-cavity orifice.

More specifically, it should be mentioned that there are known various injector arrangements in which the injector or nozzles are carried upon a distributing member which is urged axially against the mold-carrying table or a mold-bottoming plate by a threaded spindle operating in the manner of a leadscrew. The pressure generated by the spindle serves to hold a planar surface of the molded member and a planar surface of the nozzle member against one another in a sealing relationship to prevent leakage of the injection-molding material between these members. The sealing surfaces are perpendicular to the direction of displacement of the mold/nozzle structure.

This arrangement has proved to be unsatisfactory in many cases because of difficulties in obtaining exact planarity at the surfaces of two or more spaced nozzles and because of variations in the sealing of contact pressure of two members. As a consequence, one nozzle portion may seal better than another, thereby allowing some leakage at the latter nozzle.

There are also known arrangements in which the sealing pressure is obtained with the mold-carrying member and the actuating mechanism thereof. With these systems as well imperfect sealing may result and some of the materials may pass into any space developed between the mold member and the nozzle member. The excess synthetic resin may harden and may create problems with respect to pieces which have to be cleared from the machine between operating cycles.

In general terms, therefore, it may be said that conventional systems for effecting a satisfactory sealing arrangement between a multi-nozzle member and a molded member of an injection-molding press have not been attainable.

OBJECTS OF THE INVENTION

It is the principal object of the present invention to provide an improved injection-molding apparatus whereby the aforementioned disadvantages can be avoided and an effective distribution of the thermoplastic synthetic resin to a number of mold cavities can be obtained.

Another object of the invention is to provide an improved distribution system between the injector and the nozzles of an injection-molding machine whereby greater sealing effectiveness at low capital costs can be obtained.

Still another object of the invention resides in the provision of an improved nozzle assembly for a multi-nozzle injection-molding machine so constructed and arranged as to exclude the formation of unnecessary synthetic-resin pieces because of poor sealing operations in the region of the nozzles.

SUMMARY OF THE INVENTION

These objects and others which will become apparent hereinafter are achieved, in accordance with the present invention, with a manifold system for distributing the synthetic resin material from the injector assembly to a plurality of nozzles sealingly engageable with respective mold portions when the discharge orifices of the nozzle communicate with the inlet orifices of the mold cavity. The sealing pressure, according to the invention, is provided by at least one hydraulically pressurizable piston and cylinder arrangement which is independent of the sealing arrangements of the other nozzles.

In other words, each nozzle assembly comprises a movable nozzle body; a body effective as a hydraulic means for effecting the sealing may include a main hydraulically displaceable piston acting upon a body slidable in the nozzle-carrying member or upon this member itself when it is axially shiftable, to displace the nozzle anchored thereto toward the associated mold.

A further hydraulically displaceable member may be provided for movement relative to this body or the force transmitting member carried therein to operate an injection-valve needle. Thy hydraulic arrangements of the nozzle body may be actuated individually and successively (one after another) or simultaneously (in parallel).

Accordingly to still another feature of the invention, the part forming the sealing surfaces, e.g., the nozzle body itself, is movable on the nozzle-carrying member relative to this member and the other nozzle bodies carried thereby in the sealing-pressure direction. When the nozzle body is intended to register with the inlet orifice of the mold-bottoming plate, this plate and the confronting face of the nozzle body are provided with annular sealing surfaces surrounding the orifices and brought into forceful abutment by the hydraulic means. The nozzle body can be so arranged in the nozzle-carrying member that its face turned away from the mold cavity forms a piston face pressurizable by the injection-molding material to apply the sealing pressure or a portion thereof.

The system described above has numerous advantages, not least among them being the low cost of the nozzle assemblies and the sealing arrangements associated therewith. Whereas massive spindle structures were hitherto required, the present system achieves high sealing effectiveness with a relatively small-hydraulic arrangement operable with the individual nozzle body. The complex machining to achieve planarity over large sealing surfaces and for nozzles spaced relatively far apart can be eliminated, the interchangeability and replaceability of the nozzle is simplified and spurious pieces of molded material are avoided. The sealing pressure can be generated in whole or in part by the moldable material and, to that extent at least, additional sealing systems can be avoided.

DESCRIPTION OF THE DRAWING

The above and other objects, features and advantages of the present invention will become more readily apparent from the following description, reference being made to the accompanying drawing in which:

FIG. 3A is a cross-sectional view taken along the line IIIA — IIIA of FIG. 3;

FIG. 3B is a cross-sectional view taken along the line IIIB — IIIB of FIG. 3;

FIG. 3C is an end view of a portion of the device of FIG. 3;

FIGS. 6 and 7 are detail views illustrating other features of the invention.

SPECIFIC DESCRIPTION

Figure 1:
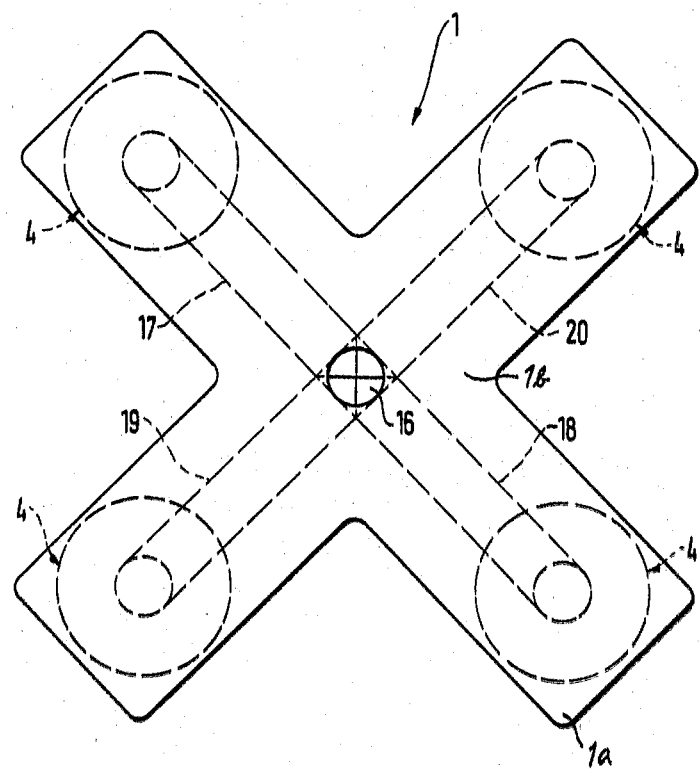
FIG. 1 is an elevational view of a four-unit distributor for an apparatus of the character described.
Figure 2:
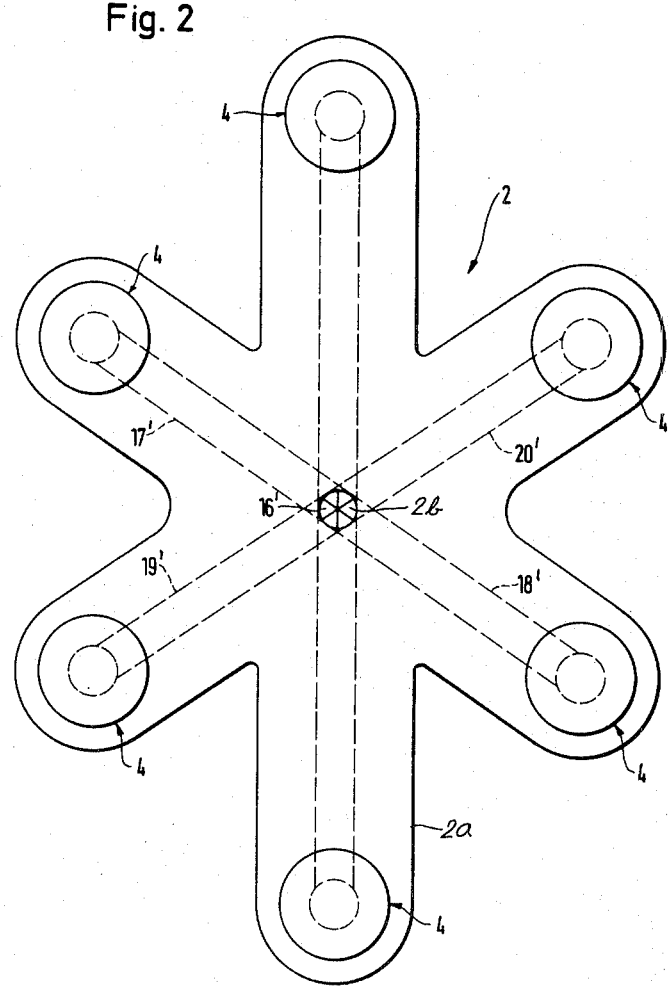
FIG. 2 is a view similar to FIG. 1 of a distributor operating with six nozzle units.

In FIGS. 1 and 2 of the drawing, we have shown distributors for injection-molding material in accordance with the present invention. The distributor or manifold member of FIG. 1, which is interposed between the source of such material and the mold, comprises four arms 1a extending from a central portion 1b in angularly equispaced relationship and defining a body represented generally at 1. A central bore 16, transverse to the plane of the distributor, extends axially into the latter from the injector member 43 etc. and terminates at intersecting bores 17 through 20 extending along the arms. Each of the bores 17 through 20 terminates at a respective injector-nozzle arrangement of the type shown in FIGS. 3 and 5.

The injector-nozzle arrangements or assemblies generally represented at 4 are thus each equidistant from the central bore 16 which is connected to the injector head, heating worm and so forth of the injection-molding machine or member.

In FIG. 2, we have shown another distributor or manifold, generally represented at 2, for an injection-molding machine having six injection-nozzle arrangements nozzles for each injector apparatus. In this case, the six arms 2a are angularly equispaced by 60° from one another about the axis 2b of the distributor. The central passage 16' of the distributor communicates with six transversely extending bores 17', 18', 19', 20' ... running along the arms and terminating in respective nozzle arrangements 4 as described in connection with FIG. 3 or FIG. 5.

Figure 3:
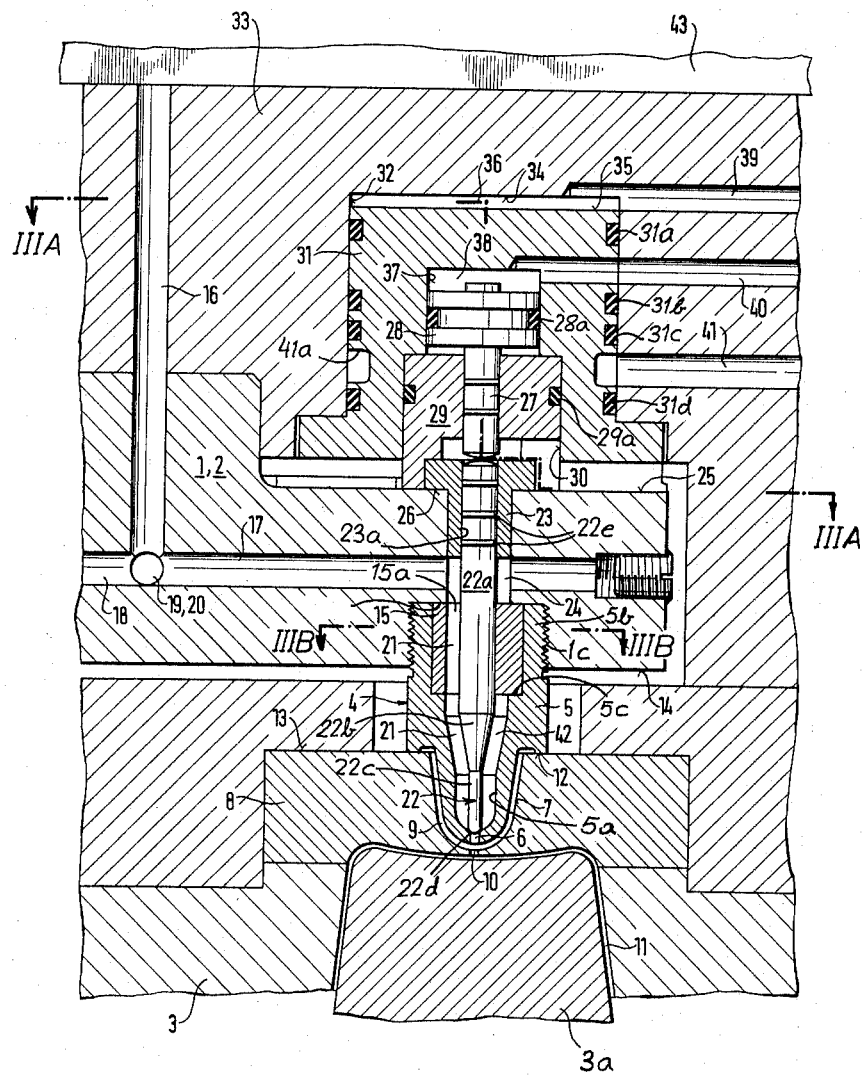
FIG. 3 is an axial cross-sectional view through a nozzle assembly according to one feature of the invention.

In the embodiment illustrated in FIG. 3, each injection nozzle arrangement 4 is provided that the end of a respective arm of the distributor 1 or 2, a portion of which has been illustrated in cross section. Thus in FIG. 3 it is possible to see the axially extending bore 16, the transversely extending bores 17 through 20 (which lie in a plane perpendicular to the axis of the device), as well as the passages connecting these bores with the interior of the nozzle.

The injection-molding machine is also provided, according to the invention, with a closable multipartite mold 3 (mold member) which, in the closed-mold position, defines a mold cavity 11 for a cup-shaped object with a core 3a and a mold-bottoming plate 8. Any additional portions of the mold, the mold-closing means etc. may be of conventional construction.

An important principle of the present invention, which will be brought out in somewhat greater detail hereinafter, is that the nozzle arrangement is not in lateral contact with the mold structure and no lateral seal is provided between the nozzle and the mold portions. On the contrary, all of the seals provided between the nozzle structure and the mold are between surfaces which lie in planes perpendicular to the mold-closing direction of movement or to the direction of movement of the mold toward the distributor or of the distributor toward the mold. Thus, there is not even lateral (sideways) contact between the nozzle and the mold.

Each injection-nozzle arrangement 4 adapted to charge the mold cavity 11 of an associated portion of the mold comprises a nozzle head 5 whose forwardly projecting end 5a is provided with a nozzle orifice 6 and is received in a rearwardly diverging antechamber 7 constituting a recess in the mold-bottoming plate 8. A gap 9 is provided between the forwardly projecting end 5a of the nozzle head 5 and the mold-bottoming plate 8 and communicates via the injection orifice 10 of the latter with the mold cavity.

The nozzle head 5 is formed with a forward-facing ancillary abutment surface or nozzle shoulder 12 which bears sealingly against the rearwardly facing surface 13 of the mold-bottoming plate 8. Furthermore, the nozzle head 5 is provided with male threads 5b received in the female threaded portion 1c of the distributor 1 or 2.

The nozzle head 5 is further provided with an internal cylindrical recess 5c accommodating a guide bushing 15 which is clamped by the nozzle head against a surface 1d at the base of the threaded bore 1c mentioned earlier.

The bores 17 through 20 communicating with each nozzle head open into the nozzle passages generally represented at 21 and having a flow cross section controlled by the nozzle needle 22. To this end, the guide bushing 15 may be provided with an axially extending passage 15a communicating with a conical passage 42 between the bushing and the nozzle orifice 6. In this region the cylindrical shaft 22a of the nozzle needle may undergo a transition to a conical portion 22b and then to the cylindrical portion 22c terminating in the pointed tip 22d illustrated in a position in which the needle blocks the orifice.

The needle 22 is provided at 22e with sealing grooves and is slidably received in the bore 23a of a needle-guide sleeve 23 whose outwardly extending shoulder 26 bears axially against the rearward face 25 of the distributor (distributor reverse surface) between the needle-guide sleeve and the bore 1c, the nozzle bore 24 of the distributor plate communicates with the respective passages 17 through 20. Thus the needle-guide sleeve 23 forms a plug centering needle 22 and preventing rearward movement of the injection-molding synthetic resin.

The rounded rearward end of nozzle needle 22, when it projects from the needle-guide sleeve 23, can engage the rounded end of a piston rod 27 which is grooved at 27a to sealingly slide in a piston-guide sleeve 29. The piston rod 27 is formed on a piston 28 whose seal is shown at 28a and slidably engages the wall of a cylinder 37 formed in a primary piston 31. The piston-guide sleeve 29, moreover, forms a piston in its own right and has a seal 29a engageably cylindrical wall of a forwardly open central recess 30 of the main piston 31. The latter is, in turn, formed with seals 31a, 31b, 31c and 31d preventing fluid leakage along its circumference in sliding engagement with the wall of a recess 32 in the nozzle guid and control plate generally represented at 33. All of the operating injection elements are thus shiftable relative to this stationary structure.

The base 34 of the cylindrical recess 32 in which the main piston 31 is accommodated and the rearwardly facing surface 35 of the main piston 31 define a chamber 36 between them which can be charged with hydraulic fluid (oil) superatmospheric pressure (e.g., a pressure of about 140 atm. gauge).

The piston 28 can be exposed to hydraulic pressure in the chamber 38 defined by it within the cylinder bore 37 and delivered by a hydraulic line 40, this pressure being about 140 atm. gauge in the preferred condition. A further passage 41 in the stationary plate 33 communicates with an outwardly open circumferential recess 41a of the main piston 31 and with an outlet for the circulation of cooling water around the nozzleneedle control device.

In accordance with the principles of the present invention, the body 1 or 2 may be axially displaceable to enable the hydraulic system to assist in sealing the nozzles. When a synthetic-resin fluid is introduced into the cavity 11 in a molten state, it may be at a pressure of 160–200 atm. gauge. The high pressure synthetic resin is then delivered via the passages 16, 17 and 21 into the nozzle cone 42 of the nozzle body 5 around the needle 22 to bias the needle upwardly, opening the nozzle orifice and injecting the fluid when this pressure is at its maximum. The synthetic-resin material then flows through the outlet orifice 6 into the space 9 between the nozzle head 5 and the mold chamber or cavity 11 9. A heat barrier is thus provided around the nozzle as the synthetic-resin material cools in contact with the mold-bottoming plate 8 which is cooled by water in accordance with conventional practices.

The needle control assembly is carried by the nonmovable (fixed) mold carrying plate 43 and is centered thereby using the conventional transport apparatus of the mold-closing device.

The hydraulic sealing arrangement, as already noted, comprises four or six injection assemblies 4 having pistons 28 and 31. These injection assemblies can, preferably with a program or other sequential means, be operated individually one after another, in pairs of opposite assemblies, or all in parallel and together. At the end of the injection steps the pistons 28 are pressurized hydraulically to close the nozzle opening 6. During the cycle, moreover, simultaneously two or more or all of the hydraulic devices can be pressurized at the respective cylinders 36 so that the pistons 31 displace via the members 30, 29 23 the body 1 or 2 and the respective nozzles 5 until the surfaces 12 sealingly engage the surface 13 of the mold-bottoming plate 8. The principal sealing force is thus applied in the region of annular contact between the surfaces 12 and 13 to produce the sealing pressure which prevents the synthetic resin from passing space 9 into the region beyond the nozzle 5.

Figure 5:
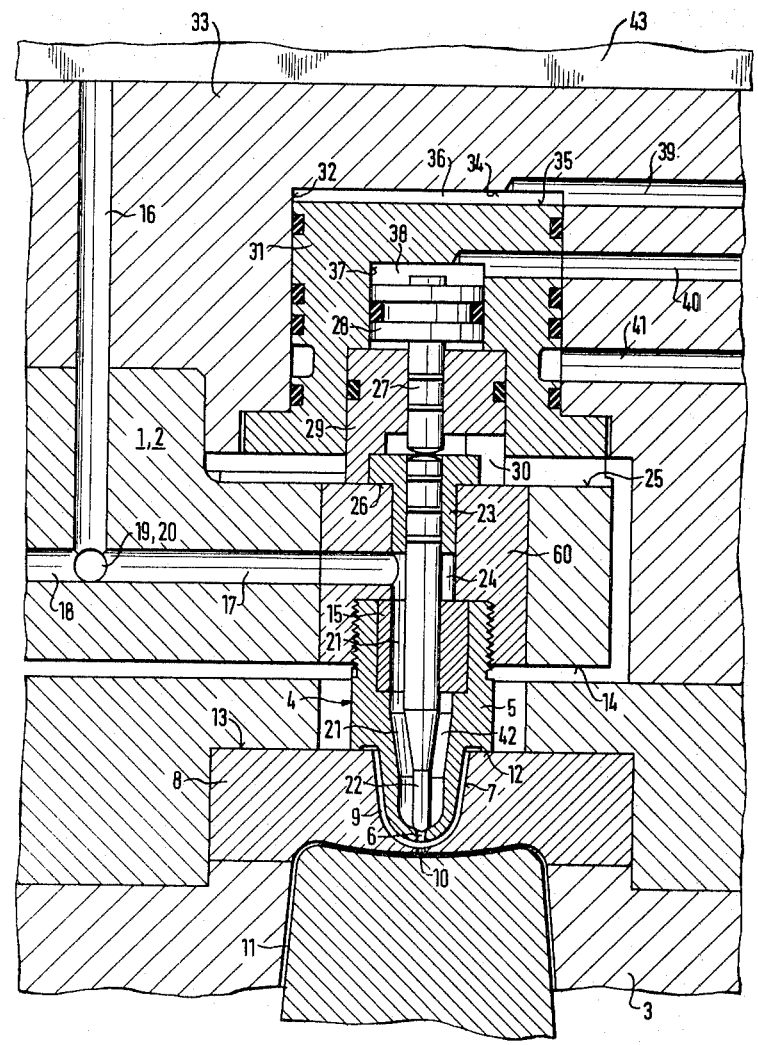
FIG. 5 is a cross-sectional view similar to FIG. 3 but representing a modification in some respects.

In FIG. 5, we have shown a modification of the system wherein members 1 or 2 are fixed with respect to the bodies 33 and 43 and the nozzle assemblies are provided in a sleeve 60 which is axially shiftable in the distributor 1 or 2. In this case, members 30 may bear upon the sleeve 60 directly and urge the latter and the nozzle body 5 entrained therewith into sealing relationship with the mold-bottoming member as previously described. Only when the seal is established, may the syntheticresin material be introduced through the nozzle in the manner described.

Figure 4:
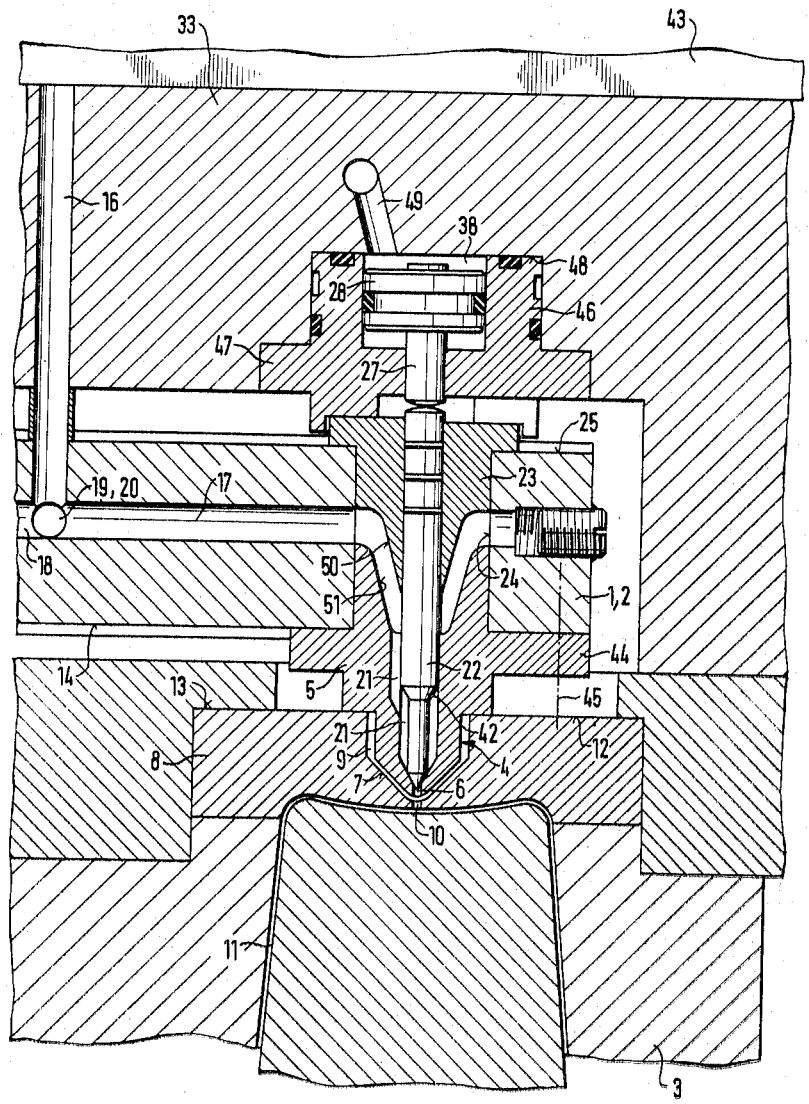
FIG. 4 is a cross-sectional view similar to FIG. 3 but illustrating another embodiment of the invention.

In FIG. 4, we have shown yet another embodiment of the invention wherein elements functionally identical to those already described have been identified with similar reference numerals. In this embodiment, the nozzle heads 5 and their sleeve 23 are so arranged and constructed that they are of equal diameter and are received in the bore 24 of the distributor 1 or 2. Sleeve 23 is fixed with respect to the latter and the nozzle head 5 is displaceable through a predetermined distance relative to the distributor 1 or 2 and transversely to this body.

The flange 44 is connected to the distributor 1, 2 by a bolt or pin diagrammatically represented at 45 which accommodates the slide axis displacement of the head 5 and serves as a guide for the latter.

The piston 28 is axially shiftable by hydraulic fluid supply at 49 to its cylinder 38, the latter being formed by a piston 46 whose flange 47 is received in and bolted to the fixed housing portion 33, the floor of the recess of the chamber in which sleeve 46 is seated is represented at 48. The pressure in chamber 38 is maintained about 140 atm. gauge and must be exceeded by the pressure of the needle 22 if latter is to open. Sleeve 46 also bears against the sleeve 23.

The passage 17 opens into the bore 24 between the sleeve 23 and the nozzle head 5 which are provided with juxtaposed downwardly convergent frustoconical surfaces 50 and 51 which define a chamber convergent conically toward the nozzle needle 22.

The embodiment illustrated in FIG. 4 has the advantage that the nozzle needle 22 can be closed only by the hydraulic fluid. The sealing pressure is obtained in this embodiment from the injection-molding material which is discharged through the orifice 6 but exerts a significantly downward pressure upon the surface 51. The sealing force is therefore directly proportional to the injection pressure. Otherwise the nozzle operates in the manner originally described. Furthermore, it is possible to use principles described in connection with FIGS. 3 and 4 in this embodiment as well. Thus, when the sleeve 46 is not bolted to the plate 33 it can exert pressure upon a sleeve such as that shown at 60 and which carries the nozzle head 5 and the sleeve 23. Alternatively, the body 1, 2 can be axially shifted when sleeve 46 is constituted as a piston. The nozzle assemblies shown in FIG. 4 may be operated individually one after another, in groups or all together and again the needle may close the nozzle under hydraulic control.

The yielding of the distributor 1, 2 is always less than the gap 9 between the nozzle head 5 and the wall 7 of the antechamber mentioned earlier. In this case, the pressure forces of the distributor are not applied to the mold-bottoming plate over any considerable area but rather are transmitted only through the nozzle bodies 5. The antechamber 7 can be eliminated when the thermal insulation between nozzle head 5 and bottoming plate 8 is obtained by other means and some degree of mobility of the nozzles in the lateral direction i.e., parallel to the surface 13, is provided for the nozzle plate.

The present invention has, as an important feature the reduction in heat transfer between the injection nozzle and the mold structure. The use of a synthetic-resin barrier filling the gap 9 for this purpose has already been described. However, other modifications of the nozzle structure may be used with a similar purpose. For example, in FIG. 6 we have shown an arrangement in which the nozzle body 105 is formed, at its end confronting the mold 103 with a cylindrical wall 105a projecting axially in the direction of the mold-bottoming plate 108. The latter is formed with the injection port 110 opening into the mold and registering with the discharge port 106 of the nozzle. The latter is threaded into the block 160 of the manifold 104 and is provided with a spacer 115 guiding the valve needle 122. In this embodiment, the wall-like projection 105a has a crown-like surface which sealingly engages, at 112, the outer surface 113 of the mold-bottoming plate. The projection 105a thus peripherally closes a shallow recess 107 around the injection orifice 110 which may fill with the injection-molding material and establish a thermoinsulating layer or heat-transfer barrier between the nozzle head 105 and the mold-bottoming plate 108. To provide further insulating effectiveness, the portion of the mold-bottoming plate 108 against which the cylindrical projection 105a bears, can be formed as a sleeve 108a provided with a wide circumferential groove or recess 108b which defines an annular chamber with the rest of the mold-bottoming plate to further restrict heat transfer between them. In FIG. 7, we have shown another modification wherein the partition-like projection is formed at 260 as a part of the manifold or distributor 204 and surrounds the nozzle 204a. The sleeve carrying the projection 260 may be threaded or otherwise mounted replaceably in the distributor. In this embodiment as well, the recess 207 may be shallow with respect to the sealing surface 212.

The improvement described and illustrated is believed to admit of many modifications within the ability of persons skilled in the art, all such modifications being considered within the spirit and scope of the invention except as limited by the appended claims.

We claim:

1. An injection-molding machine comprising an injection member adapted to displace a stream of thermoplastic synthetic-resin material at an elevated pressure; a mold member having at least one mold cavity and a plurality of inlet orifices in spaced-apart relationship, each communicating with a mold cavity; and a distributor member interposed between said injection member and said mold member for distributing said synthetic-resin from said injection member to said orifice, at least one of said members being shiftable relative to another of said members for urging said members together for distribution of said material, said distributor member comprising a respective nozzle assembly registerable with and adapted to communicate with each of said orifices, said distributor member having respective generally annular surfaces surrounding each of said orifices, and means for selectively displacing said surfaces for applying same against said mold member for individual sealing of said nozzle assemblies with said orifices. said mold member comprising a mold-bottoming plate formed with said orifices and juxtaposed with said distribution member, said mold-bottoming plate being provided with respective recesses opening in the direction of said distributing member and communicating with the respective orifices, said distributing member comprising a body provided with a plurality of arms together formed with one of said nozzle assemblies and a central passage communicating with said injection member and respective passages traversing said arms from said central passages to the respective assemblies, each of said nozzle assemblies comprising an injection nozzle head receivable with limited clearance in the respective recess and provided with an injection orifice, and a valve needle received in the respective nozzle head for selectively blocking the injection orifice thereof, each of said surfaces surrounding the respective nozzle head and bearing annularly upon said mold-bottoming plate around the respective clearance, said body being provided at each arm with a respective hydraulically displaceable piston operatively connected to the respective needle for controlling the displacement thereof.

2. The injection-molding machine defined in claim 1 wherein the means axially aligned with each of said nozzle assemblies is so constructed and arranged as to enable a number of said surfaces to be displaced individually in a predetermined succession.

3. The injection-molding machine defined in claim 1 wherein the means axially aligned with each of said nozzle assemblies is so constructed and arranged as to displace a plurality of said surfaces simultaneously.

4. The injection-molding machine defined in claim 1 wherein the means axially aligned with each of said nozzle assemblies includes an annular body forming part of said assembly and hydraulic means urging the last-mentioned body against said mold member.

5. The injection-mold machine defined in claim 1 wherein the means axially aligned with each of said nozzle assemblies includes an injection nozzle and fluid-pressure means for biasing said nozzle against said mold member.

6. The injection-molding machine defined in claim 5 wherein said fluid-pressure means includes said injection member and the fluid pressure is the pressure of said synthetic-resin material.

7. The injection-molding machine defined in claim 1, further comprising means for displacing each of said assemblies, including the respective said surface, axially in the direction of said mold-bottoming plate.

8. The injection-molding machine defined in claim 1 wherein each of said surfaces is formed directly on said nozzle head and said nozzle head is axially shiftable in said body for applying the respective surface to said mold-bottoming plate.

* * * * *